United States Patent [19]
Hayashi

[11] Patent Number: 5,628,008
[45] Date of Patent: May 6, 1997

[54] STRUCTURED DOCUMENT SEARCH FORMULA GENERATION ASSISTING SYSTEM

[75] Inventor: Shoichi Hayashi, Kanagawa, Japan

[73] Assignee: Fuji Xerox Co., Ltd., Tokyo, Japan

[21] Appl. No.: 490,249

[22] Filed: Jun. 14, 1995

[30] Foreign Application Priority Data

Jun. 15, 1994 [JP] Japan .................................. 6-133105

[51] Int. Cl.$^6$ .................................................. G06F 17/30
[52] U.S. Cl. ........................... 395/603; 395/604; 395/774
[58] Field of Search .................................. 395/144–146, 395/12, 20, 54, 60, 61, 600, 934; 364/419.19, 419.07

[56] References Cited

U.S. PATENT DOCUMENTS 5,438,512  8/1995  Mantha et al. ...................... 364/419.1
5,553,216  9/1996  Yoshioka et al. ...................... 395/145

Primary Examiner—Paul V. Kulik
Attorney, Agent, or Firm—Finnegan, Henderson, Farabow, Garrett & Dunner, L.L.P.

[57] ABSTRACT

A structured document used for exemplifying a retrieved result is analyzed by a structure analyzing section, and its structure is expanded in a memory. A search-formula structure extracting section consecutively fetches fixed-type structural patterns stored in a knowledge base, and finds a structural pattern including a substructure of the structured document exemplified by the user. A search-condition extracting section determines a value of a field used for a search formula with respect to each of the records contained in the substructure extracted by the search-formula structure extracting section. A search-formula synthesizing section synthesizes an expression in a form which can be recognized as a search formula. The synthesized search formula can be modified by a search-formula editing section in compliance with an edit instruction from the user on condition that the exemplified substructure is retrievable.

4 Claims, 14 Drawing Sheets

PATTERN 1:

PATTERN 2:

PATTERN 3:

(ATTRIBUTE = SECTION) / (ATTRIBUTE = PARAGRAPH OF TEXT) /
(ATTRIBUTE = DRAWING AREA) / ((ATTRIBUTE = DRAWING) #
((ATTRIBUTE = AREA HEADING) / ^.))

STRUCTURED DOCUMENT SEARCH FORMULA GENERATION ASSISTING SYSTEM

BACKGROUND OF THE INVENTION

1. Field of the Invention

The present invention relates to a system for assisting the generation of a search formula used for retrieval when retrieval processing is carried out with respect to a structured document in a structured document processing apparatus for processing a structured document.

2. Description of the Related Art

Conventional structured document processing apparatuses include those which are capable of effecting retrieval by giving as a search condition a pattern containing information on the context, i.e., the hierarchical structure, of a structured document. In addition, apparatuses for assisting the generation of a search formula have also been developed. By using such an apparatus, the user is capable of inputting and revising a search condition by inputting a conditional formula through graphical representation and by editing the same. With the conventional structured document processing apparatuses, however, the user himself must conceive the search condition from the outset and input the same. For that reason, the user must accurately know in advance how the internal structure of the structured document is represented.

With the conventional apparatuses for assisting the generation of a search formula through graphical representation, since the internal structure of the structured document is represented in a form capable of being recognized by input devices, so as to enable users who do not possess accurate knowledge about grammar to prepare a grammatically correct formula. With such apparatuses, however, the users are still required to have accurate knowledge about the representation of the internal structure of the structured document.

Furthermore, the conventional apparatuses for processing a structured document do not assist the preparation of a formula having a correct meaning. For this reason, even though retrieval is a very useful function, retrieval has not become a function which can be used easily by not only skilled users but also general users.

SUMMARY OF THE INVENTION

In view of the above-described circumstances, it is an object of the present invention to provide a system for assisting the generation of a search formula which makes it possible to easily obtain a correct search formula for retrieval.

According to a first aspect of the invention, there is provided a system for assisting generation of a search formula used for effecting retrieval processing with respect to a structured document, comprising:

storage means for storing the structured document;

structure extracting means for extracting, based on a substructure of the structured document exemplified by a user as a search result, a substructure including the exemplified substructure; and search formula synthesizing means for synthesizing a search formula from the extracted substructure.

According to a second aspect of the invention, the above system further comprises search formula editing means for modifying the search formula in accordance with an editing operation instruction from a user on condition that the modified search formula matches the substructure used in synthesizing the search formula.

According to a third aspect of the invention, there is provided a system for assisting generation of a search formula used for effecting retrieval processing with respect to a structured document, comprising:

searching means for effecting a search in accordance with a search formula;

input means for allowing a user to indicate an error in results of the search by the searching means; and search formula correcting means for correcting the search formula based on a substructure including a portion corresponding to the indicated error and a structure of the search formula.

According to a fourth aspect of the invention, the above system further comprises a database for sequentially storing information on respective branches appearing in the structure of the search formula and on sets of branches appearing in the structure of the error-indicated search formula, wherein the search formula correcting means corrects, while referring to the database, the search formula based on candidates for correction other than candidates for correction of the search formula including any of the sets of branches stored in the database.

In the system according to the first aspect of the invention, the user is allowed to present an example of a search result, and a substructure which includes a substructure of the structured document obtained by the exemplification is extracted by the structure extracting means. Then, a search formula is automatically synthesized from the extracted structure by the search formula synthesizing means, thereby making it possible to obtain a grammatically correct search formula through a simple operation of exemplification.

In addition, there are cases where retrieval is desirably effected by strengthening or weakening the condition of the synthesized search formula. For this reason, in the system according to the second aspect of the invention, the search formula synthesized by the search formula editing means can be modified. However, if modification is carried out freely, there may be generated an irrational search formula in which the exemplified search result is not included. The search formula editing means executes the modification processing of the search formula on condition that the modified search formula matches the substructure used at the time of synthesis. Consequently, the user is always capable of obtaining a correct search formula which can retrieve the substructure exemplified at the time of synthesis.

In the system according to the third aspect of the invention, in a case where an unintended search result is obtained, an erroneous portion of the search result is exemplified not by the search formula side but by the user through the input means, and the search formula correcting means automatically correct the search formula so as to correct the indicated error on the basis of the substructure including the exemplified portion as well as the structure of the search formula. The search formula correcting means is capable of consecutively correcting the search formula even if the information on the indicated error is incomplete, i.e., even if the entire error has not been pointed out, and only a portion of the erroneous portion has been exemplified. At this time, with an increase in the number of indications concerning the error, it is possible to make correction for obtaining a more proper search formula so as to solve the entire error.

In the system according to the fourth aspect of the invention, information on sets of branches appearing in the structure of the search formula for which an error has been pointed out is sequentially stored in the database, and when a correction is made by the search formula correcting means, it is possible to ensure that a correction will not be carried out with respect to the information stored in the database, i.e., the search formula for which an error has been pointed out. Consequently, it is possible to obtain a kind of learning effect whereby a past history has been learned, so that the correction of the search formula can be carried out without repeating the same errors which have been clarified up until that point of time.

DESCRIPTION OF THE PREFERRED EMBODIMENTS

Figure 1:
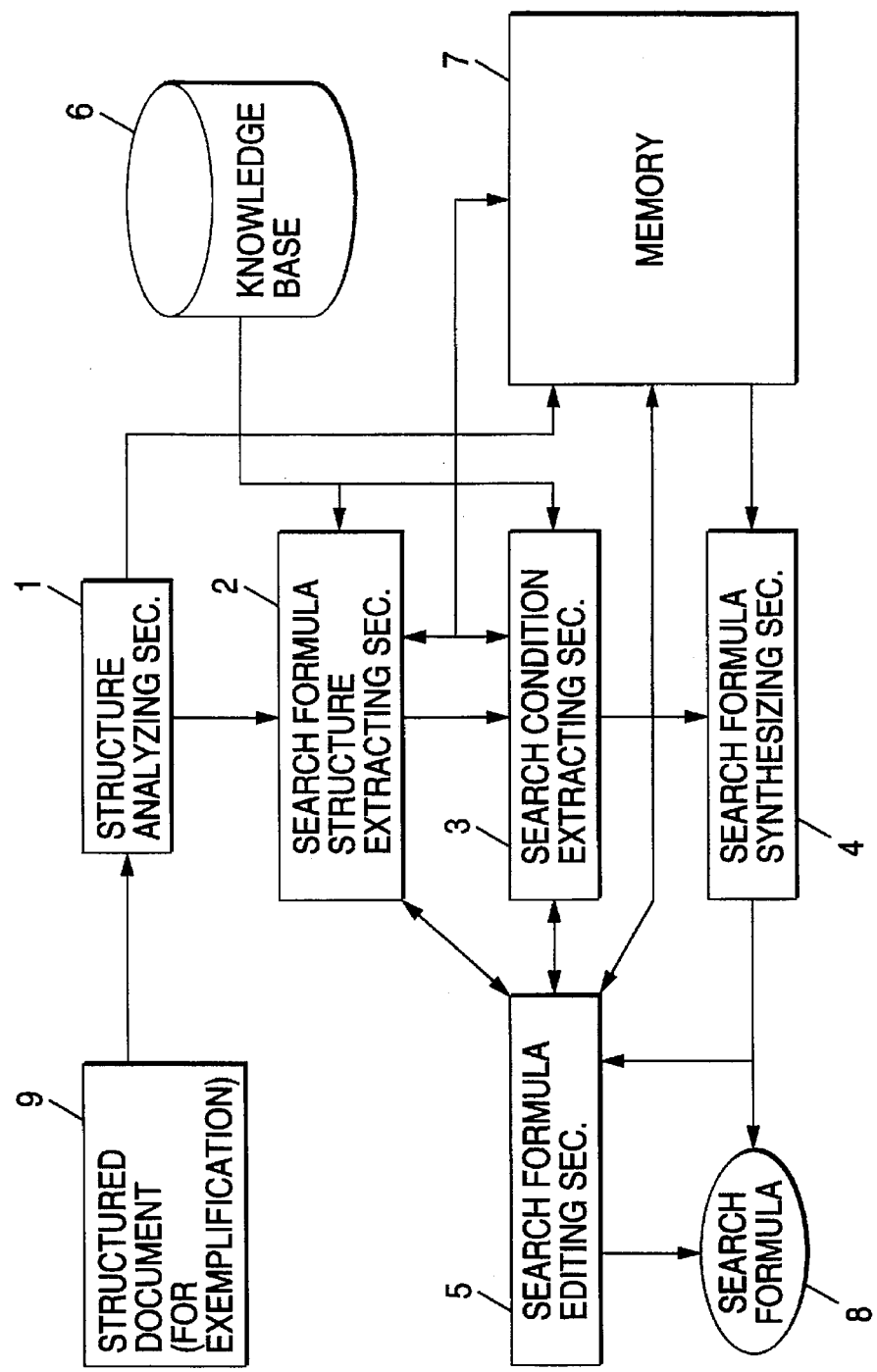
FIG. 1 is a block diagram of a first embodiment of a system for assisting the generation of a search formula in accordance with the present invention.

FIG. 1 is a schematic diagram illustrating a configuration of a first embodiment of a system for assisting the generation of a search formula in accordance with the present invention. In the drawing, reference numeral 1 denotes a structure analyzing section; 2, a search-formula structure extracting section; 3, a search-condition extracting section; 4, a search-formula synthesizing section; 5, a search-formula editing section; 6, a knowledge base; 7, a memory; 8, a search formula; and 9, a structured document.

The structure analyzing section 1 analyzes the structured document 9 used for exemplifying a retrieved result, and its structure is expanded in the memory 7. At this time, the hierarchical structure of the structured document 9 used for exemplification is stored as a tree structure of records having pointers in two ways between nodes that are in parent-child relationships and sibling relationships. The search-formula structure extracting section 2 consecutively fetches fixed-type structural patterns stored in the knowledge base 6, and finds each pattern which matches a substructure including the substructure of the structured document exemplified by the user. Then, marks are provided to all the records which match the fixed-type structural patterns thus found. The search-condition extracting section 3 determines values of fields used for a search formula with respect to the respective records contained in the substructures extracted by the search-formula structure extracting section 2. The search-formula synthesizing section 4 consecutively fetches the records of the substructures provided with the marks, and synthesizes an expression in a format recognizable as a search formula. The search-formula editing section 5 performs transformation with respect to the search formula synthesized by the search-formula synthesizing section 4 in accordance with an edit instruction from the user, thereby generating a new search formula. At this time, the transformation of the search formula is carried out insofar as the validity that the substructure instructed up till then is searchable is not undermined. The context (substructure) used for a search by a skilled user is stored in the knowledge base 6 after being formatted in fixed types.

Figure 2:
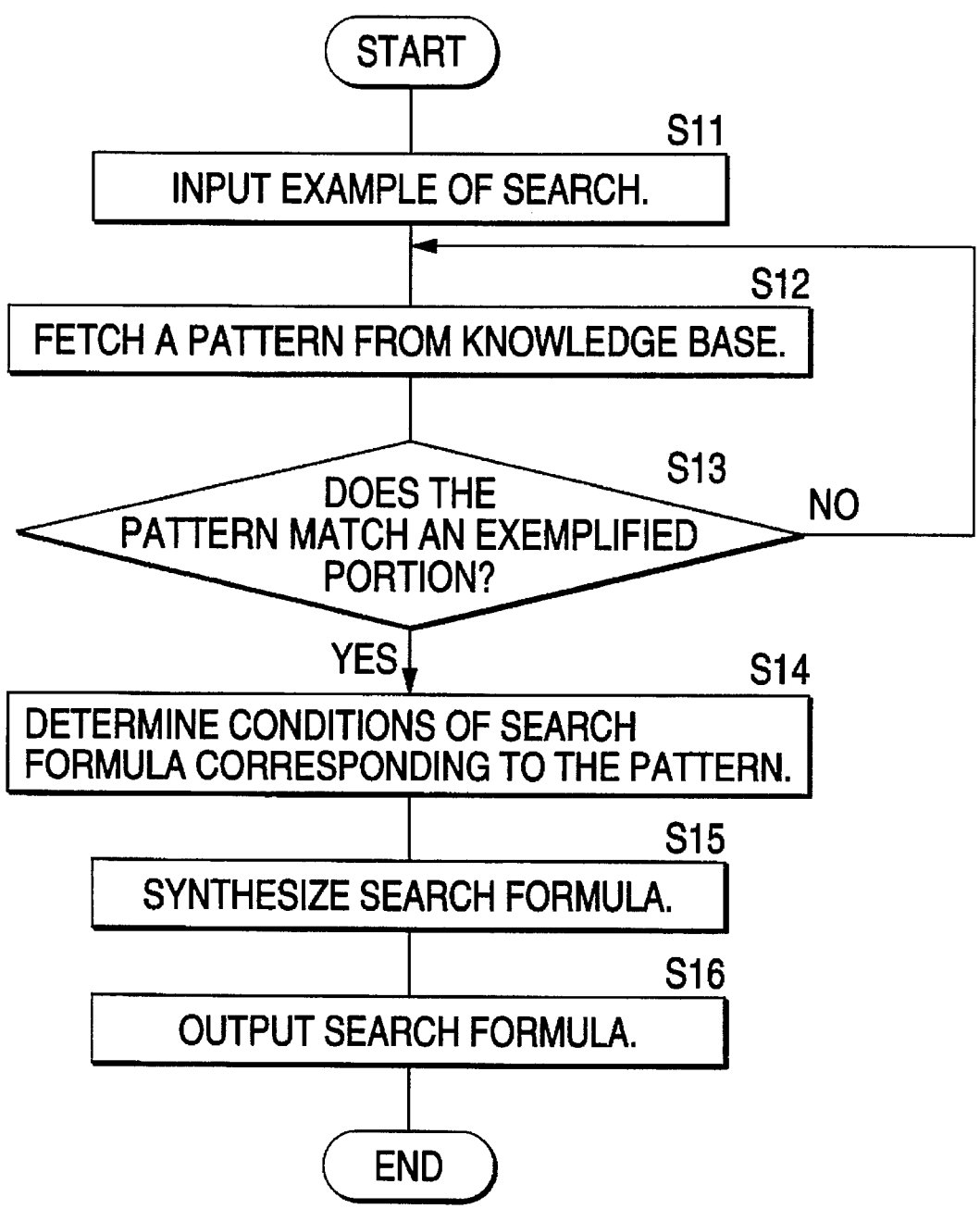
FIG. 2 is a flowchart illustrating the operation of generating a search formula in the first embodiment of the system for assisting the generation of a search formula in accordance with the present invention.

FIG. 2 is a flowchart illustrating the operation of generating a search formula in the first embodiment of the system for assisting the preparation of a search formula in accordance with the present invention. In S11, the user exemplifies portions to be searched by using, for example, a structured-document editor or the like. The exemplification can be done if, for example, a record being displayed by the structured-document editor or the like is designated and entered by means of such as a pointing device. Through this exemplification, it is possible to obtain an identifier of the designated record. A record which matches the identifier is located in the structured document for exemplification which is expanded in the memory 7, and the record in the structured document stored in the memory 7 is provided with a mark.

Next, in S12 and S13, the substructure exemplified by the user, i.e., the substructure which contains the marked record in the structured document in the memory 7, is extracted by using the knowledge base 6. The context used for retrieval by skilled users is stored in the knowledge base 6 as substructures, and substructures which are expected to be used by skilled users as search conditions are stored therein so as to search substructures exemplified by users. For this reason, even if an instruction is given by an unskilled user, it is possible to obtain search conditions which are substantially equivalent to those used by skilled users. The extracted substructure is one which has the same pattern as that of one of the structures stored in the knowledge base 6 including the substructure exemplified by the user. Marks are provided to all the records which are in the structured document in the memory 7 and match the extracted fixed-type substructural pattern. The marked records constitute substructures (subtrees) of the document structure expanded in the memory 7. These substructures constitute a structure with which the search formula should be provided.

In S14, a condition of a search formula corresponding to the extracted substructures is determined. Although the structure with which the search formula should be provided is determined in steps up to S13, attributes of respective records, i.e., conditions such as drawings, headings, and paragraphs, are also required at the time of search. For this reason, conditions for a search are determined by referring to the extracted substructures in the structured document in the memory 7, i.e., the attributes of the marked records.

In S15, a search formula is generated by the search-formula synthesizing section 4 on the basis of the partial structures and conditions for a search. In S16, the generated search formula is outputted. It is sufficient for the user to effect retrieval processing by using the outputted search formula.

Although, in the above-described configuration, rules held in the knowledge base 6 are used at the time of extracting fixed-type structural patterns by the search-formula structure extracting section 2, if the rules held in the knowledge base 6 do not include the substructure exemplified by the user, it is possible to provide, for instance, means for setting a corresponding substructure by a default rule, or for extracting a similar structure by inference and presenting the same to the user. In addition, as a procedure for returning a substructure corresponding to the substructure exemplified by the user without using the knowledge base 6, it is possible to adopt a configuration in which such a procedure is incorporated in the program.

Figure 3:
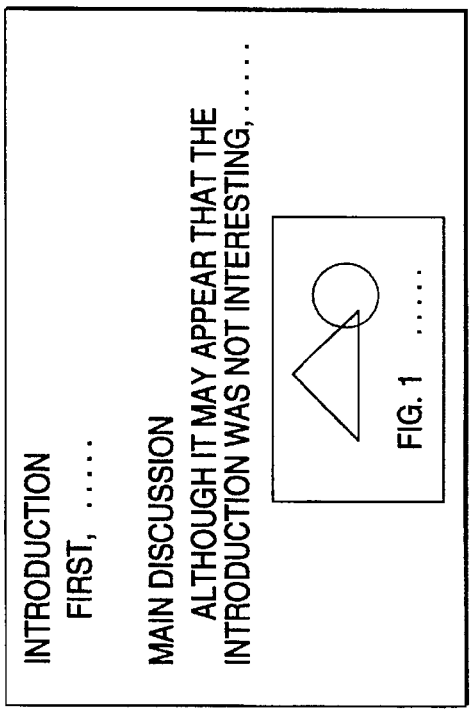
FIG. 3 is a diagram illustrating an example of a structured document.
Figure 4:
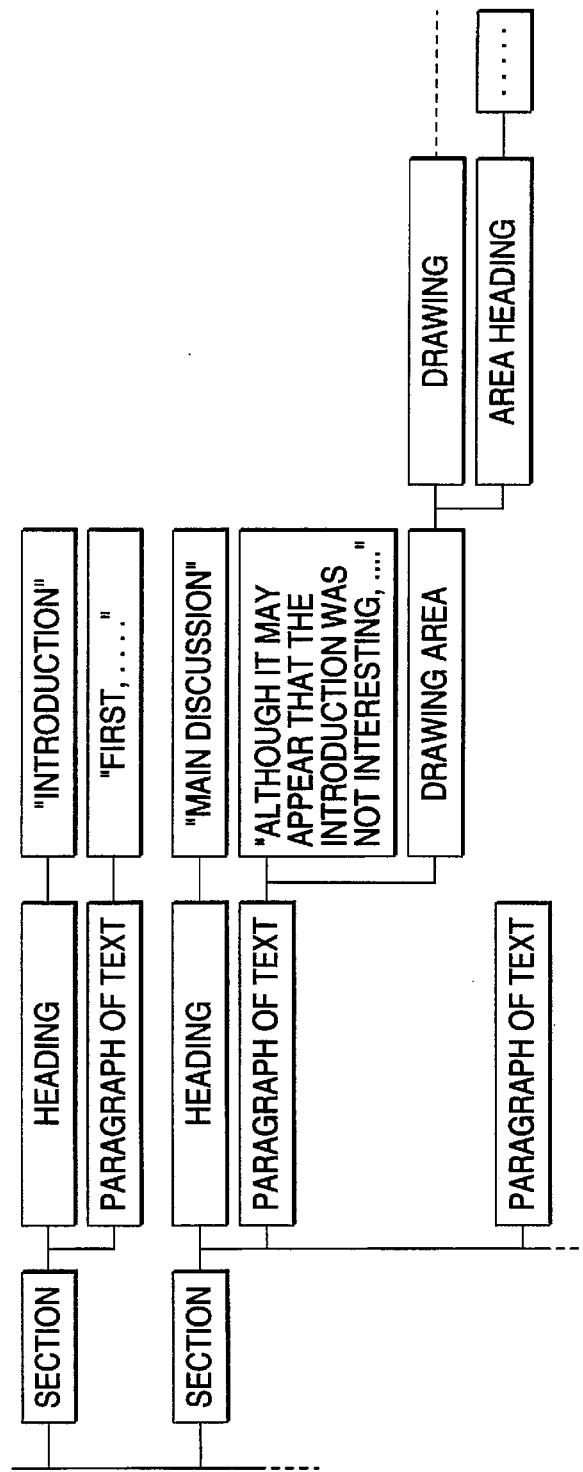
FIG. 4 is a diagram illustrating an example of how the structured content of the structured document is represented.

FIG. 3 is a diagram illustrating an example of a structured document, and FIG. 4 is a diagram illustrating an example of how the internal structure of a structured document is represented. In the document shown in FIG. 3, headings such as "INTRODUCTION" and "MAIN DISCUSSION" as well as their respective texts and a drawing are given. Such a document can be represented as a tree structure such as the one shown in FIG. 4. That is, two "sections" representing the overall introduction and the overall main discussion are present in the document shown in FIG. 3. For example, the "section" representing the introduction includes a "heading" and a "paragraph of the text," and a character string "INTRODUCTION" is present as the content of the "heading." In addition, the drawing is contained in the "section" representing the overall main discussion, and is specifically contained as a "drawing area" in the "paragraph of text" of the "section." The drawing is comprised of an image portion of the drawing and the heading of the drawing. The same applies to the remaining portion of the document as well. Thus, in a structured document, the, structure of the document is represented by a tree structure.

Figure 5:
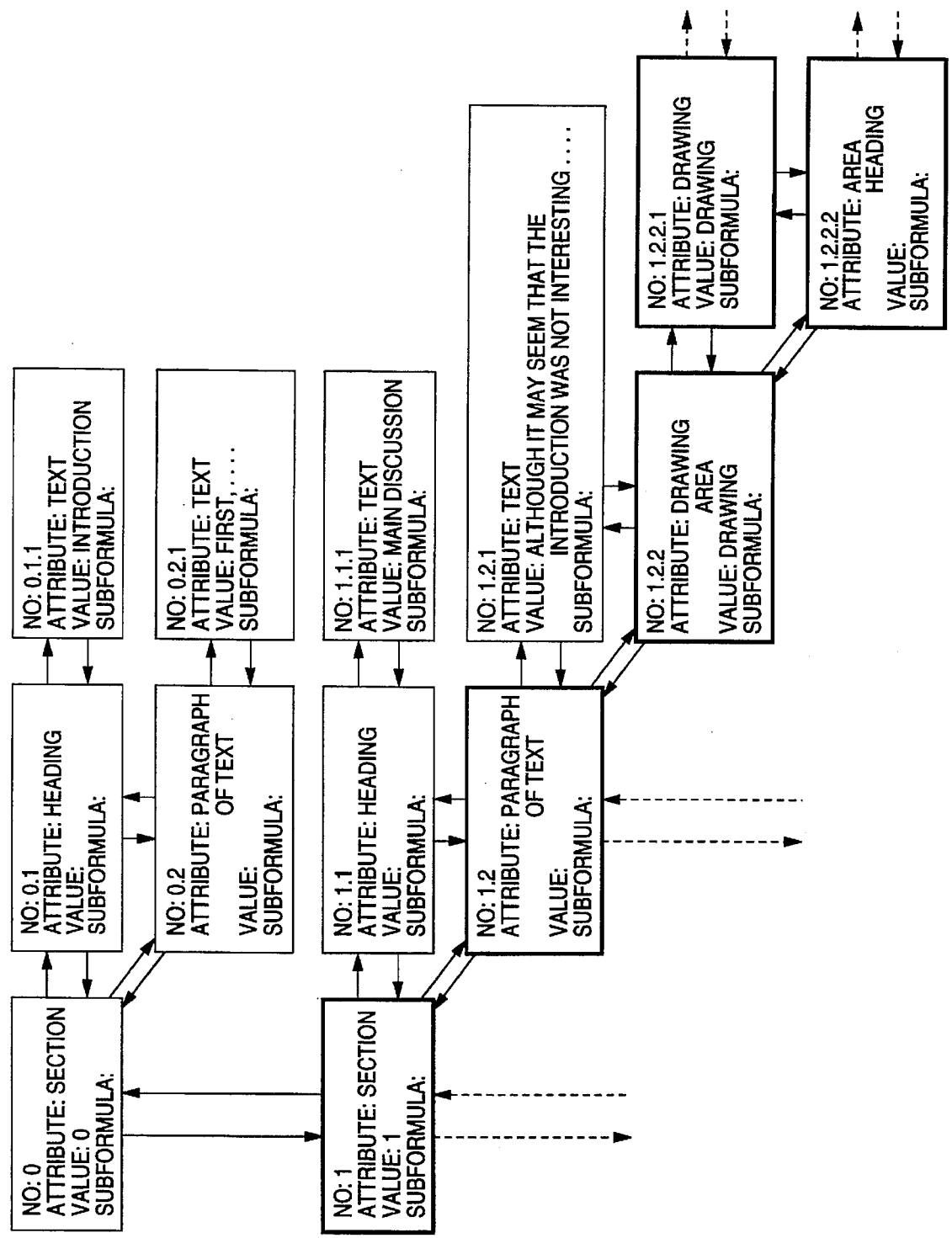
FIG. 5 is a diagram illustrating an example of the structure of the structured document stored in a memory 7.

FIG. 5 is a diagram illustrating an example of the structure of a structured document stored in the memory 7. As for the structured document 9 for exemplification, the structure of the document is analyzed by the structure analyzing section 1. For example, a structured document having the structure shown in FIG. 4 is stored in the memory 7 with a data structure such as the one shown in FIG. 5. That is, the hierarchical structure of the structured document is stored as a tree structure having pointers in two ways between nodes that are in parent-child relationships and sibling relationships.

Portions in the structured document which constitute nodes of the tree structure represent records. In FIG. 5, the records are denoted by rectangular boxes, respectively. Each record has a number of fields. The following fields are shown in FIG. 5: "No." which constitutes an ID of a record, an "attribute" indicating a type of record, a "value" indicating the content actually appearing in the text such as text data, and a "subformula" for storing information used for a search formula. It goes without saying that other fields may be provided. For example, the field "subformula" may be managed by a different type of record than this record.

The portion or structure having the character string "MAIN DISCUSSION" in FIG. 4 corresponds to a record having "1.1.1" as the field "No." in FIG. 5. This record has the "text" as the field "attribute," and the character string "MAIN DISCUSSION" as the field "value." The field "No." is arranged to represent the hierarchical structure, and in a case where its value is "1.1.1," it means that it is a child of the record "1.1" which, in turn, is a child of the record whose value is "1." As described above, each record has pointers with respect to a parent, a child, and a sibling.

Figure 6:
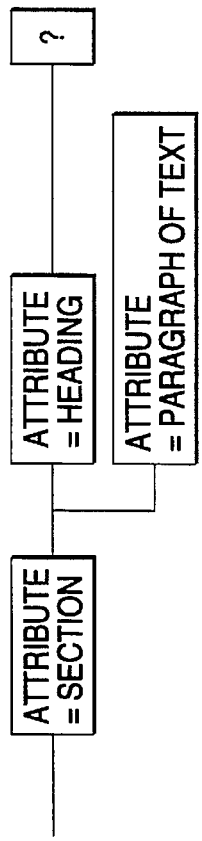
FIG. 6 is a diagram illustrating examples of fixed-type structural patterns stored in a knowledge base 6.

FIG. 6 is a diagram illustrating examples of fixed-type structural patterns stored in the knowledge base 6. Patterns of various fixed-type substructures which would be used for retrieval by skilled users are stored in the knowledge base 6. For example, the pattern 1 in FIG. 6 shows a substructure in which two records, i.e., a record having a "heading" as the value of the field "attribute" and a record having a "paragraph of main text" as the value of the field "attribute," are present as children of a record having a "section" as the value of the field "attribute," and whatever a substructure may be connected as a child of the record of the "heading." Similarly, the pattern 2 shows a substructure in which a record of a "paragraph of main text" is present as a child of a record having a "section" as the value of the field "attribute", a record of a "drawing area" is present as its child, and a record whose attribute is indefinite and a record of an "area heading" are present as its children, the last-mentioned record having a record which is its child. Although a method of determining the attribute of the aforementioned record whose attribute is indefinite will be described later, the fact that a re! cord has an indefinite attribute means that its attribute may be any attribute in terms of a rule of the knowledge base. However, before the synthesis of a search formula this attribute is set in such a manner as to be equivalent to the attribute of a specifically exemplified structure, and that attribute is used as a condition during retrieval.

Referring to FIGS. 4 and 6, a description will be given of the specific operation of the first embodiment of the system for assisting the generation of a search formula in accordance with the present invention. It is assumed that, for example, the structured document 9 for exemplification such as the one shown in FIG. 4 has been developed into a structure such as the one shown in FIG. 5 by the structure analyzing section 1 and has been stored in the memory 7, and that fixed-type patterns such as those shown in FIG. 6 have been stored in the knowledge base 6.

Here, a case is considered in which the user has designated an "area heading" as the exemplification of a result of retrieving the structured document shown in FIG. 4. The search-formula structure extracting section 2 refers to the content of the knowledge base 6 shown in FIG. 6, and extracts the pattern 2 in FIG. 6 as a substructural pattern including the designated "area heading." At this time, there are cases where a plurality of substructural patterns are extracted, in which case an arrangement can be provided such that substructural patterns including the plurality of extracted substructural patterns are generated, or one substructural patterns is selected in accordance with a certain criterion.

When the pattern 2 is extracted, marks are provided to records which match the pattern 2. Namely, in the example shown in FIG. 5, marks are provided to the records indicated by the thick lines. The marked records are substructures of the structure expanded in the memory 7 and constitute a structure with which the search formula should be provided.

Indefinite records such as "attribute=?" and "?" are present in the extracted pattern 2. To determine applicable fixed-type substructural patterns found from the knowledge base 6, the search-condition extracting section 3 extracts necessary information from fields for storing the contents of corresponding records, and stores the same in their respective fields "subformula." The record whose field "No." is "1.2.2.1" corresponds to "attribute" in the pattern 2 in FIG. 6. From this fact, it can be understood that the portion "attribute" may be used in addition to the structure of the pattern 2 stored in this knowledge base 6. For this reason, the content of the, field "attribute" in the record whose field "No." is "1.2.2.1" is set in the field "subformula" as "attribute=drawing."

If records which are not provided with marks are present between marked records, although such records are not present in this example, the degree of freedom concerning the depth of the structure in a parent-child relationship and the degree of freedom concerning the number of other structures which may exist between records in a sibling relationship are determined, and are stored as part of the field "subformula."

Figure 7:
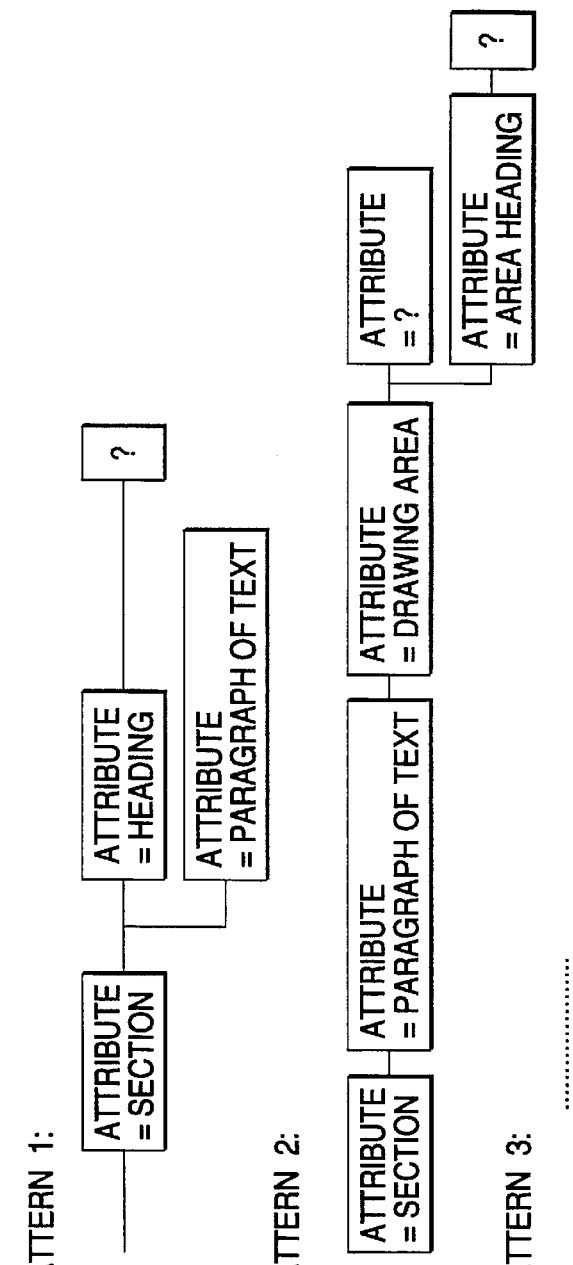
FIG. 7 is a diagram illustrating an example of a generated search formula.

Finally, records of the marked substructures indicated by the thick lines in FIG. 5 are consecutively fetched, and a search formula is synthesized by an expression in a form which can be recognized as a search formula by the apparatus which effects retrieval. FIG. 7 is a diagram illustrating an example of a generated search formula. As shown in FIG. 7, although the search formula itself is an expression which is difficult to understand, by using the system for assisting the generation of a search formula in accordance with the present invention a search formula such as the one shown in FIG. 7 can be automatically generated without knowing the method of expression of a search formula. It suffices if the generated search formula is an expression which can be recognized by the apparatus which actually effects retrieval. The user carries out retrieval by the apparatus which actually effects retrieval by using the generated search formula.

As specifically shown in FIG. 7, a search formula for a structured document is generally expressed in the form of a tree structure, and specifies the following conditions:

1. Condition of an attribute of a node which is an object of retrieval.
2. Condition of an attribute of a node which should appear in the vicinity of the object of retrieval.
3. Positional relationship between the node subject to retrieval and the node mentioned in condition 2 above.

For instance, in the search formula shown in FIG. 7, since the object of retrieval is the "area heading," the expression "(attribute =area heading)" is the condition of the attribute of a node which is the object of retrieval. The remaining expression "(attribute =. . . )" is the condition of the attribute of a node which should appear in the vicinity of the object of retrieval. Symbols such as "/.""#" and the like connecting them are conditions specifying the positional relationships. Included among the conditions specifying the positional relationships is a constraint concerning the length of a branch between two nodes in the search formula (i.e., the number of nodes appearing between nodes which correspond to each other) which is actually required in the tree structure of a document.

The search result is one which is a node in the document structure which satisfies the condition of the attribute in condition 1 specified in the search formula, wherein in the vicinity of that node there is a node which satisfied the condition of the node attribute shown in condition 2, and that node is present in such a manner as to satisfy the positional relationship stated in condition 3. That is, the search result constitutes one node in the substructure (subtree) which is present in the tree structure of the document and has the same configuration as that of the search formula.

Next, a description will be given of the operation concerning the editing of the search formula in accordance with the first embodiment. As described above, the search condition constitutes a substructure (subtree) of the document structure which is given for exemplification. In general, the correction of a search condition is equivalent to the modification of this subtree. For example, if the condition is to be strengthened, it suffices to add a branch of the tree or fix the length of the branch. Conversely, if the condition is to be weakened, it suffices to prune a branch or make the length of a branch freely changeable.

Figure 8:
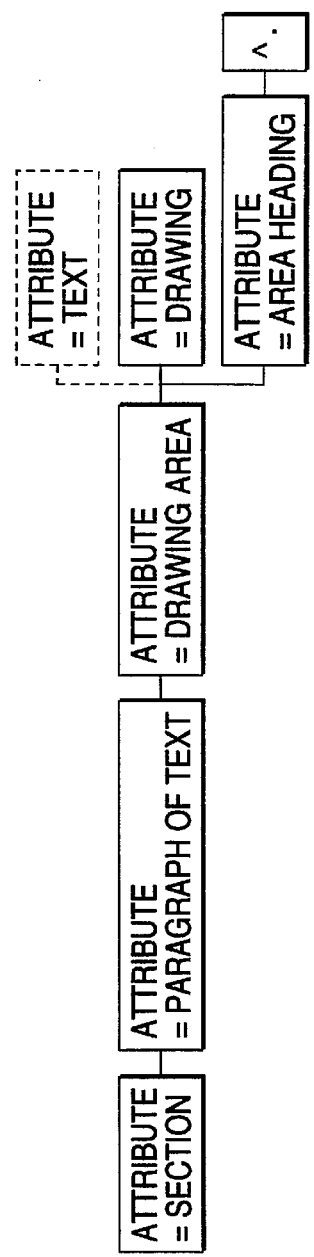
FIG. 8 is a diagram illustrating a problem encountered when the search formula is edited.

However, if the addition or pruning of a branch with respect to a subtree of the conditional formula is effected freely, there is a danger that it becomes impossible to search even the exemplified portion. FIG. 8 is a diagram illustrating a problem encountered when a search formula is edited. Portions which are indicated by the solid lines in FIG. 8 show a tree structure of a search condition obtained by extracting a subtree formed into a search formula by being provided with marks. For instance, if a new branch (the branch "attribute =text") indicated by the broken lines in FIG. 8 is added to this tree structure, it becomes impossible to overlap the new branch with the tree structure of the structured document shown in FIG. 5. For this reason, it becomes impossible to retrieve the substructure exemplified at the time of generating a search formula.

If only inspection for checking a grammatically correct structure is carried out, since the condition in which the branch indicated by the broken lines in FIG. 8 is added is correct, it is impossible to detect such an error. Accordingly, in the present invention, the arrangement provided is such that in a case where an editing operation corresponding to the addition of a branch to the tree structure and the designation of the length is carried out while referring to the structure shown in FIG. 5 during editing, the editing operation is allowed only when the result can overlap with the structure shown in FIG. 5. Thus the search-formula editing section 5 includes an error-preventing mechanism.

Figure 9:
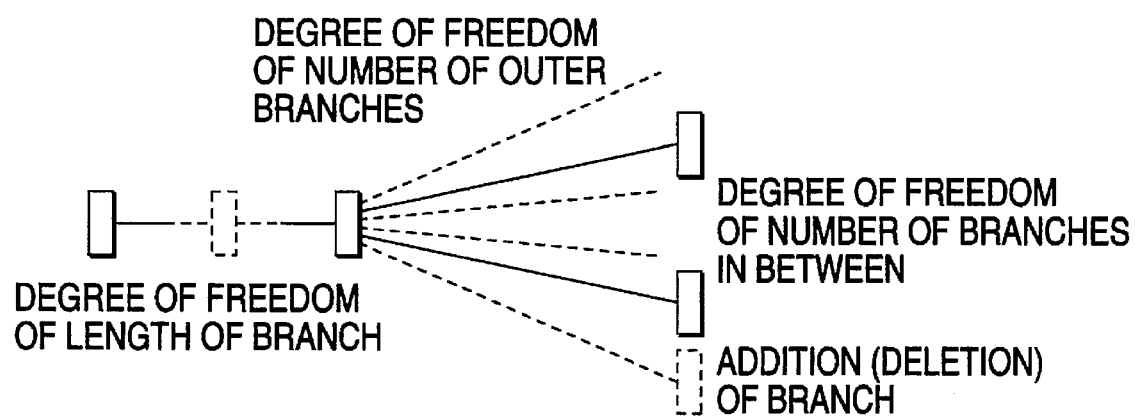
FIG. 9 is a diagram illustrating an example of an editing operation by a search-formula editing section 5.

FIG. 9 is a diagram illustrating an example of an editing operation in the search-formula editing section 5. As shown in FIG. 9, the modification which can be effected by an editing operation can be classified into five operations: the addition of a branch, the deletion of a branch, the degree of freedom concerning the length of a branch, the degree of freedom concerning the number of additional branches which may exist between two branches (or on an outer side of an outermost branch), and the modification of the pattern of a subformula. At the time of these editing operations, it is possible to utilize the functions of the search-formula structure extracting section 2, the search-condition extracting section 3, and the like.

With respect to each of these operations, in a case where editing is effected for a certain node, whether the operation is correct or not is determined in the following manner.

First, in the case of the addition of a branch, the respective nodes correspond to the records shown in FIG. 5, and the records which are in a parent-child relationship and a sibling relationship are linked in the structure. As a result, it can be determined that the addition of a branch is correct if a record is present after the links are traced in the direction in which the addition of the branch has been instructed. In the case of the deletion of a branch, there is no need for determination, and the deletion is always correct. Nevertheless, the degree of freedom concerning the number of branches which may exist between branches adjacent to both sides of the branch to be deleted is set to infinity.

In the case of the modification of the degree of freedom concerning the length of a branch, in the first place, an increase in the degree of freedom is always correct. When the degree of freedom is reduced, the links in the parent-to-child relationship are traced, their length is checked, and a determination is made that the modification is correct if the set degree of freedom includes that length.

In the case of the degree of freedom concerning the number of branches which may exist between branches (or on an outer side of an outermost branch), in the first place, an increase in the degree of freedom is always correct. When the degree of freedom is reduced, the links in the sibling relationship are traced, the number of branches between them is checked, and a determination is made that the modification is correct if the designated degree! of freedom includes that number.

In the case of the modification of the pattern of a subformula, the field of a corresponding record is referred to, and if the field matches the modified pattern, a determination is made that the modification is correct.

In the above-described manner, in compliance with an edit instruction from the user, the search-formula editing section 5 performs editing with respect to a search formula. At that time, the search-formula editing section 5 executes only an operation which is determined to be correct by the above-described determining method, thereby making it possible to always effect the modification of a formula which is correct not only grammatically but also semantically.

The user is capable of preparing a search formula by simply exemplifying one search result by using the system for assisting the generation of a search formula in accordance with the above-described first embodiment. Consequently, general users who do not know the internal structure of the structured document or the grammar of the formula are capable of obtaining search formulae simply. In essence, however, not only a single search formula but a multiplicity of search formulae are conceivable as search formulae capable searching the exemplified substructure. For this reason, an excess or a shortage with respect to an intended result is quite likely to occur with respect to a result of search using the automatically synthesized search formula. In such a case, the search formula must be corrected.

In the above-described first embodiment, a search-formula editing means is used for the correction of a search formula. As a result, it is possible to edit a search formula while always maintaining the correctness of a search condition. However, with the above-described example of the search-formula editing means, in a case where an automatically obtained search formula is to be corrected, the search formula itself is corrected by the user. At that time, the user himself must think how to correct the search formula. That is, at this stage the user is required again to have a certain degree of knowledge concerning the internal structure of the structured document and grammar. Thus the correction of a search formula is not easy.

In a second embodiment which will be described below, a description will be given of a system for assisting the generation of a search formula which is capable of automatically correcting the search formula by pointing out not the search formula but an erroneous portion of the search result in a case where an unintended search result is obtained by an erroneous conditional formula.

As also mentioned in the first embodiment, the search formula is generally represented by a tree structure, and the correction of a search condition corresponds to a modification of the tree structure of the search formula. As already explained with reference to FIG. 9, if it is assumed that, for instance, the subtree shown by the solid lines in FIG. 9 is an original search condition, the search condition can be corrected by adding thereto a change concerning the state of a branch indicated by the broken lines in FIG. 9. If the condition is to be strengthened, it suffices if a branch of the tree is added, or the length of the branch is fixed. In other words, if it is made impossible to overlap the branch with the tree which is the structure of the result of search of the original document, this portion is not included in the search result. On the other hand, if the condition is to be weakened, it suffices if a branch of the tree is pruned, or the length of a branch is made freely changeable.

Figure 10:
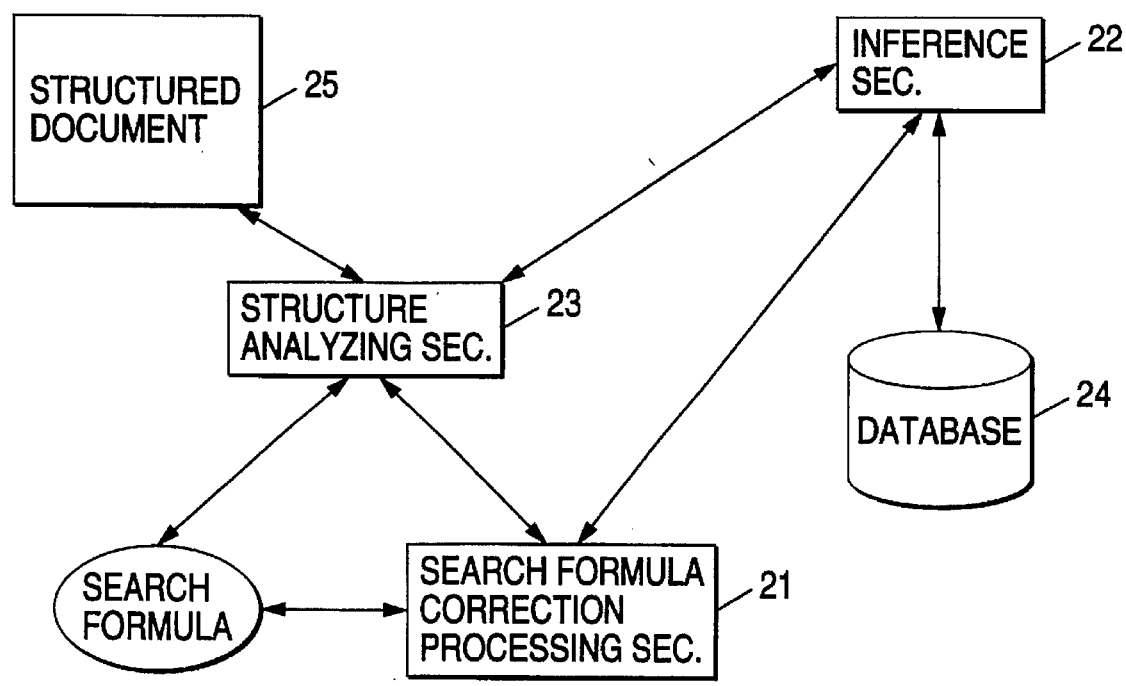
FIG. 10 is a block diagram of a second embodiment of the system for assisting the generation of a search formula in accordance with the present invention.

FIG. 10 is a block diagram illustrating the second embodiment of the system for assisting the generation of a search formula in accordance with the present invention. In the drawing, reference numeral 21 denotes a search-formula correction processing section; 22, an inference section; 23, a structure analyzing section; 24, a database; and 25, a structured document. In addition, there are an input section and a search section which are not shown.

The search-formula correction processing section 21 receives from the input section an indication from the user concerning an error, and corrects a search formula in such a manner as to include the indicated substructure of the structured document as a search result or to delete the same from the search result by using the inference section 22 and the structure analyzing section 23.

In compliance with the request from the search-formula correction processing section 21, the inference section 22 determines a need for correcting the search formula, presents a corrected version of the search formula, and effects registration and retrieval with respect to the database 24. The database 24 stores information on each branch of the structure included in an inquiry to the inference section 22. With respect to each branch, information on whether that branch is included in the present search formula and information on the degree of freedom concerning the length of that branch are all registered as hypotheses. With respect to a combination of hypotheses which has been found to be incorrect as a result of an indication from the user or the like, information on the fact of the combination of hypotheses being incorrect and the reason for the incorrectness are also registered. As the reason for being incorrect, it is possible to register the node pointed out by the user as being in error. Further, evaluation function are registered in advance in the database 24 so as to evaluate the need for changing a relevant branch on the basis of the size of the overall tree of the search formula, the number of branches to be deleted, the shape of the tree, and the like. An evaluation function includes the shape of a tree as an input parameter. Therefore, the evaluation function is defined in the form of a pair of the shape of a tree and a mathematical formula.

In compliance with an instruction from the search-formula correction processing section 21, the structure analyzing section 23 analyzes the structure of the search formula, compares the substructure of the structured document 25 with the structure of the search formula, and extracts a result of the comparison or a predetermined substructure. For example, regarding whether the corrected version presented by the inference section 22 includes the branch pointed out by the user, the structure analyzing section 23 compares the substructure of the 2525 with the corrected version, and reports the result. In addition, in a case where a node to be added is present, the structure analyzing section 23 extracts a branch which is not present in the vicinity of that node and is present only in the search formula. Also, in a case where a node to be deleted is present, the structure analyzing section 23 extracts a branch which is not present in the vicinity of the node to be deleted and is present in the vicinity of a node which has been found to be correct.

Figure 11:
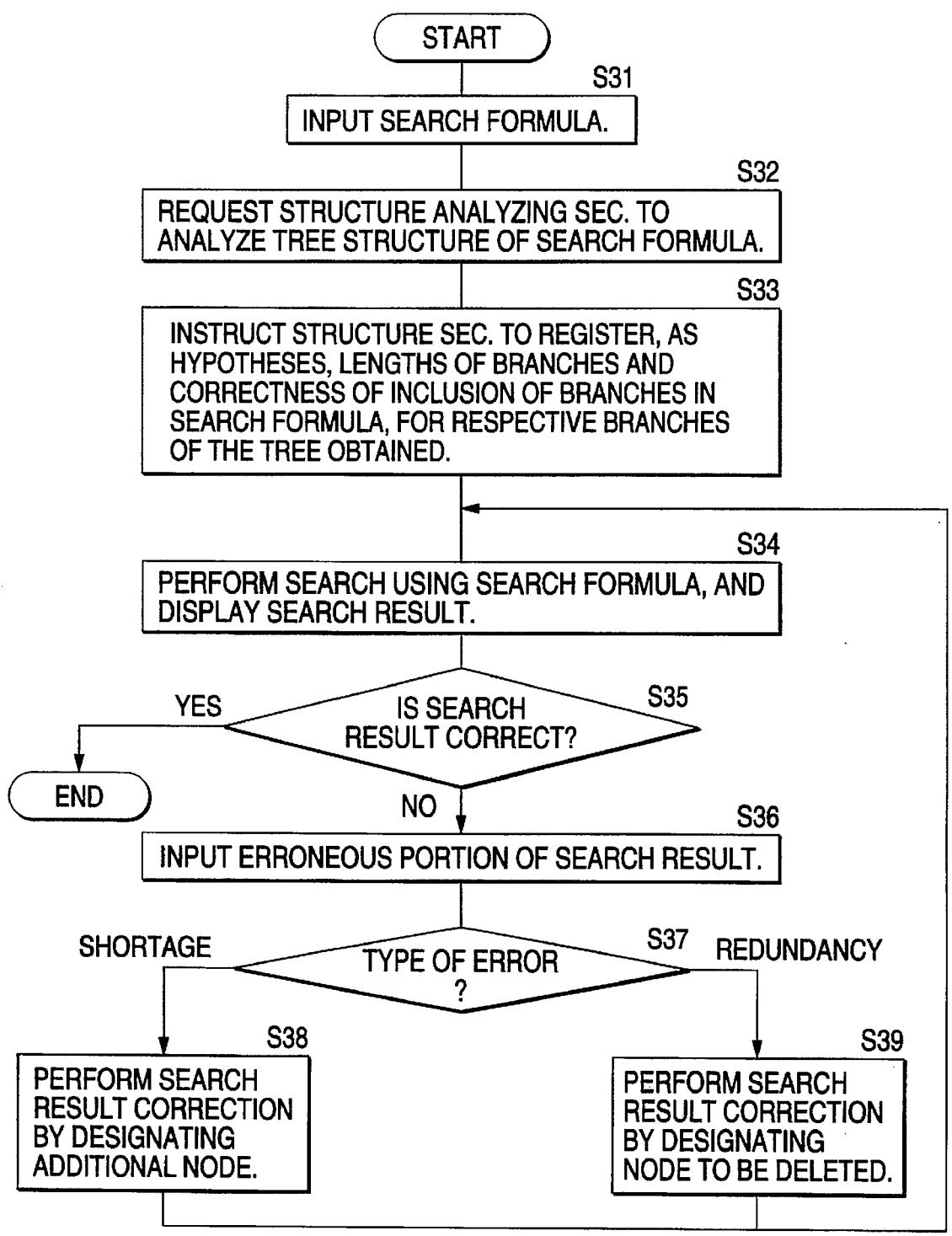
FIG. 11 is a flowchart illustrating an example of the operation in the second embodiment of the system for assisting the generation of a search formula in accordance with the present invention.

FIG. 11 is a flowchart illustrating an example of the operation in the second embodiment of the system for assisting the generation of a search formula in accordance with the present invention. First, in S31, the search-formula correction processing section 21 obtains as a present search formula a search formula automatically synthesized in the above-described first embodiment or a search formula directly given by the user. Then, in S32, the structure analyzing section 23 is requested to analyze the tree structure of the search formula with respect to each branch and its length regarding the search formula.

In S33, on the basis of an answer from the structure analyzing section 23, the inference section 22 is notified of the lengths of the respective branches and the fact that the inclusion of the branches in the search formula is correct, which are given as hypotheses. On the basis of this notification, the inference section 22 registers the information on each branch of the search formula in the database 24.

In S34, a search is performed by the unillustrated search section by using the present search formula, and the search result is presented to the user. The user refers to the search result thus presented, and determines in S35 whether there has been an excess or a shortage with respect to a result intended by the user. If there has been an excess or a shortage, in S36, the user consecutively points out erroneous portions. If this indication is one which points out a shortage in the search result, the operation proceeds from S37 to S38 so as to correct the search formula in such a way that the indicated node will be added to the search result. On the other hand, if the indication made by the user is one which points out a redundant search result, the operation proceeds from S37 to S39 so as to carry out processing for correcting the search formula in such a way that a search will be made by excluding the indicated node. Then, the corrected search formula is set as the present search formula, and the operation returns to S34, thereby making it to effect a further correction.

Figure 12:
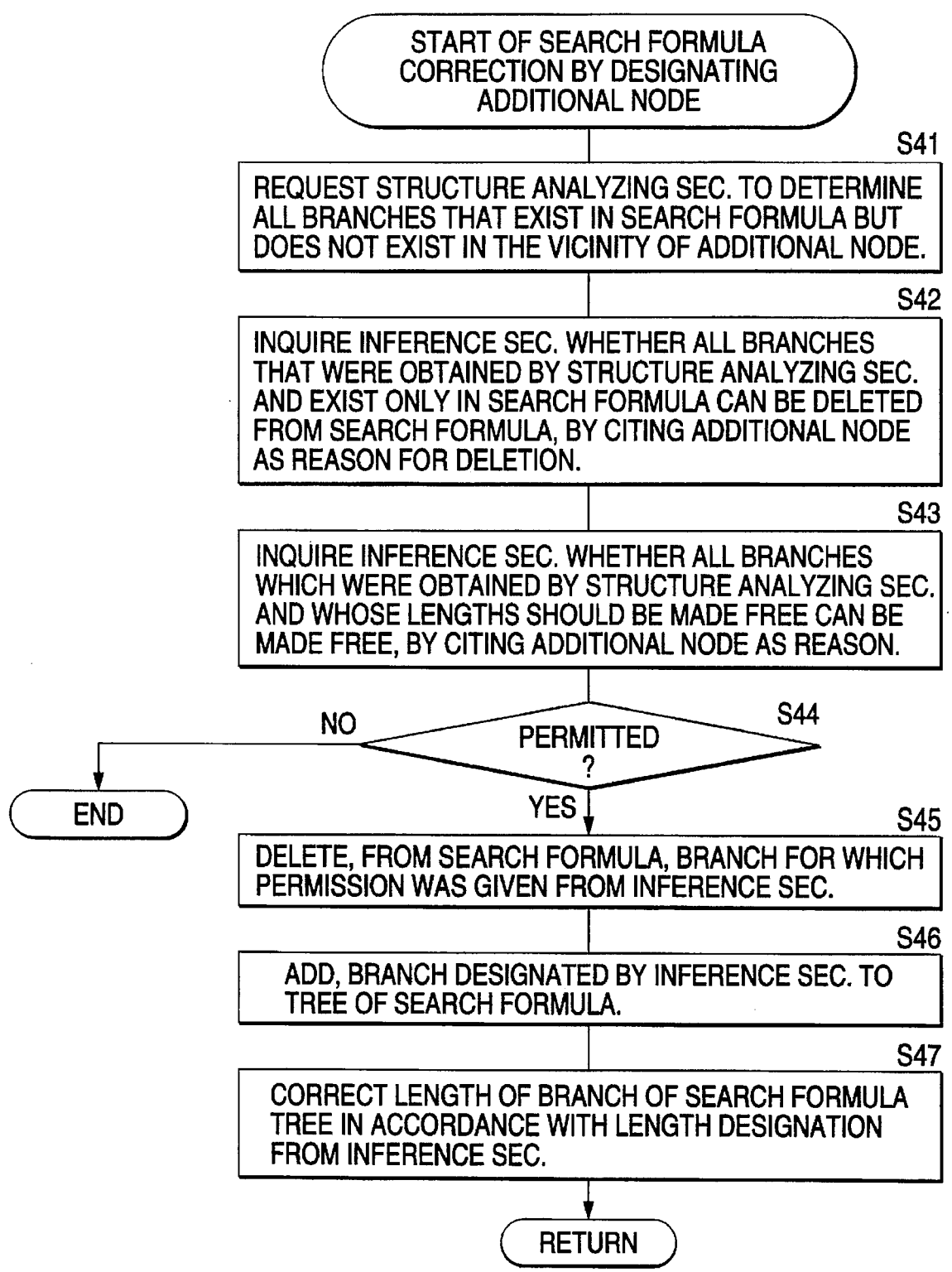
FIG. 12 is a flowchart illustrating an example of the correction processing of a search formula by the designation of an additional node.

FIG. 12 is a flowchart illustrating an example of processing for correcting a search formula by the designation of a node to be added. A description will be given of a case where a node which lacks in the search result obtained by the search formula is present. In this case, the user points out an example of a portion which must be included as the search result. Hereafter, the portion thus pointed out will be referred to as an additional node. The number of additional nodes that are pointed out is not restricted to one, and a plurality of additional nodes may be pointed out.

In S41, the search-formula correction processing section 21 instructs the structure analyzing section 23 to find all the branches of the search formula which are not present in the vicinity of the additional node and are present only in the structure of the search formula, by making a comparison between the tree structure of the search formula and the structure of the additional node in the structured document 25 and in the vicinity thereof. The structure analyzing section 23 examines the presence of corresponding branches in the vicinity of the additional node with respect to each branch of the search formula. At this time, an examination is made under the assumption that the length of each branch of the search formula is freely changeable, and the result of examination is returned to the search-formula correction processing section 21. In the case where the examination is made by changing the length of the branch from a fixed state to a freely changeable state, information on the branch whose state was changed to the freely changeable state is also included in the answer.

In S42, the search-formula correction processing section 21 inquires the inference section 22 as to whether or not all the branches, which were obtained in the answer from the structure analyzing section 23 and are present only in the structure of the search formula, can be deleted from the search formula. When the inquiry is made to the inference section 22, the additional node is notified as the reason why those branches are to be deleted. The inference section 22 evaluates whether or not the branches can be deleted, and notifies the result to the search-formula correction processing section 21. Similarly, in S43, the search-formula correction processing section 21 inquires the inference section 22 as to whether or not the branches whose lengths were altered to the freely changeable state by the structure analyzing section 23 can be made free, and the search-formula correction processing section 21 receives an answer from the inference section 22.

If a permission is given from the inference section 22 with respect to all the branches in S44, the correction of the search formula is possible. At this time, since the inference section 22 not only gives a permission but also gives an instruction concerning the addition of another branch to the search formula or the designation of the length of the branch, the search-formula correction processing section 21 changes the tree structure of the search formula to that state accordingly. Namely, in S45 the search-formula correction processing section 21 deletes the branch for which a permission was given from the inference section 22, in S46 the search-formula correction processing section 21 adds the branch designated by the inference section 22, and in S47 the search-formula correction processing section 21 changes the length of the branch designated by the inference section 22. Through this processing, the processing for changing the tree structure of the search formula by means of an additional node in the search-formula correction processing section 21 is completed.

If, in S44, it is determined that there was any branch for which the permission was not given from the inference section 22, a determination is made that that portion should be searched by another formula, and correction is given up. Then, the user is notified to that effect, and a measure is taken for such as invoking processing for automatically synthesizing a search formula for that portion.

Figure 13:
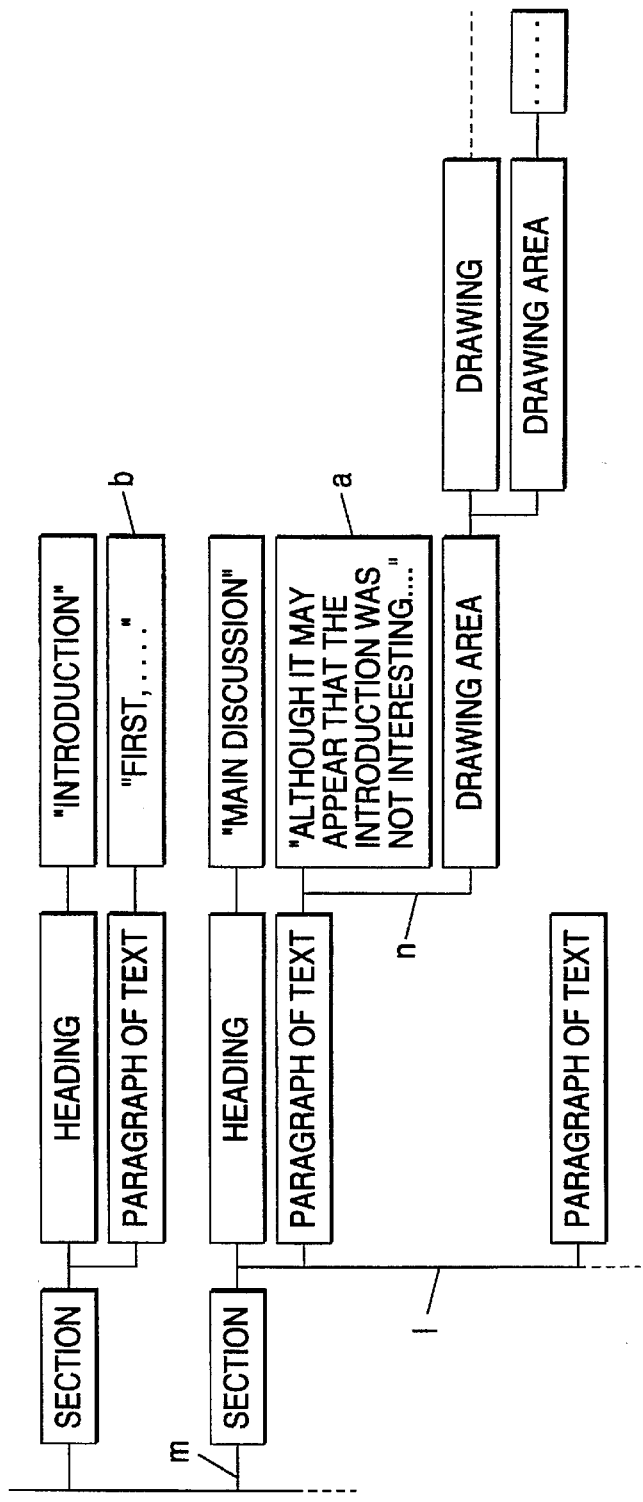
FIG. 13 is a diagram illustrating an example of a substructure of a structured document for explaining a specific example of the correction of a search formula.
Figure 14:
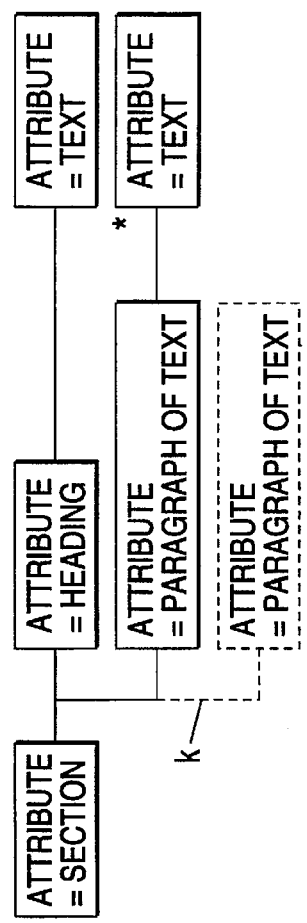
FIG. 14 is a diagram illustrating an example of the structure of a search formula subject to correction.

FIG. 13 is a diagram illustrating an example of a substructure of a structured document for explaining a specific example of correcting a search formula, and FIG. 14 is a diagram illustrating an example of the structure of a search formula subject to correction. A case is considered in which retrieval is effected by a search formula having the structure including a portion indicated by the broken lines in FIG. 14 with respect to the structured document having the structure shown in FIG. 13. The * marks in the drawing indicate extracting positions. In this case, the search result is the node a "Although it may appear that the introduction was not interesting, . . . " in FIG. 13. Here, the user points out that the node b "First, . . . " in FIG. 13 should also appear as the search result. Then, the structure analyzing section 23 makes a comparison between the structure of the search formula shown in FIG. 14 and a surrounding substructure including the node b in FIG. 13, and extracts a branch which is not present in the vicinity of the node b and is present only in the structure of the search formula. In this example, since a branch k indicated by the broken lines in FIG. 14 is not present in the vicinity of the node b in FIG. 13, this branch k is extracted by the structure analyzing section 23. Then, if the inference section 22 allows the branch k to be deleted from the structure of the search formula, the search-formula correction processing section 21 deletes the branch k from the structure of the search formula, so that the search formula is corrected in such a manner as to be provided with only the structure indicated by the solid lines in FIG. 14. Then, as a search is carried out by the corrected search formula, both portions of the node a and the node b in FIG. 13 are included in the search result.

Figure 15:
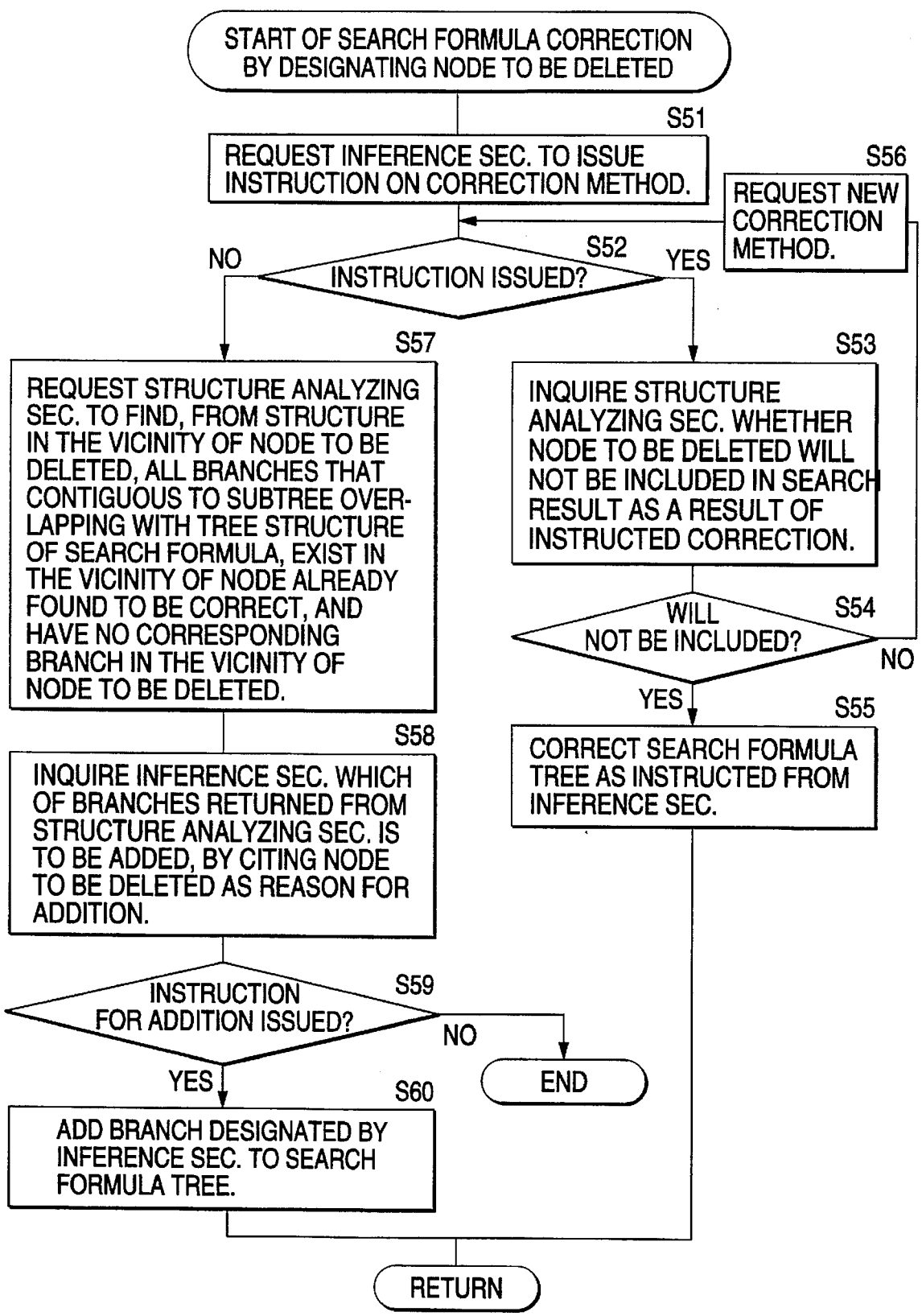
FIG. 15 is a flowchart illustrating an example of the correction processing of a search formula by the designation of a node to be deleted.

FIG. 15 is a flowchart illustrating an example of processing for correcting a search formula by the instruction of a node to be deleted. In a case where an excess portion is obtained as a search result, the user points out an example of an excess portion as the search result. Hereafter, the portion thus pointed out will be referred to as a node to be deleted.

If the user designates a node to be deleted, in S51 the search-formula correction processing section 21 requests the inference section 22 to instruct a correcting method since the present search formula is not correct. If an instruction for correction is received from the inference section 22, the operation proceeds from S52 to S53 in which the search-formula correction processing section 21 requests the structure analyzing section 23 to examine whether or not the node to be deleted will not be included in the search result as a result of correction of the search formula on the basis of the instruction received from the inference section 22. In S54, if an answer is received from the structure analyzing section 23 that the node to be deleted will not be included, in S55 the instruction for correction obtained earlier from the inference section 22 is adopted, and the structure of the search formula is changed to the instructed state.

In S54, if the node to be deleted is still included in the search result even in compliance with the instruction for correction received from the inference section 22, in S56 the search-formula correction processing section 21 requests the inference section 22 to instruct a new correcting method since the previous correcting method was incorrect. Then, the operation returns to S52 and the search-formula correction processing section 21 repeats the aforementioned steps until a correct correcting method is given by the inference section 22.

In S52, if an answer is given from the inference section 22 that the correction cannot be made, processing in and after S57 is carried out. In S57, the search-formula correction processing section 21 instructs the structure analyzing section 23 to find all branches that are contiguous to a subtree overlapping with the tree structure of the search formula with respect to the structure in the vicinity of the node which is already found to be correct as an object of retrieval and the structure in the vicinity of the node to be deleted, the branches being such that they are present in the vicinity of the node which is already found to be correct, and a corresponding branch is not present in the vicinity of the node to be deleted. Then, in S58, the search-formula correction processing section 21 inquires the inference section 22 as to which of the branches extracted by the structure analyzing section 23 is to be added to the search formula. At this time, the node to be deleted is notified to the inference section 22 as the reason for addition. The inference section 22 selects one from the branches extracted by the structure analyzing section 23, and returns an instruction to the search-formula correction processing section 21 so as to add the selected branch to the tree of the search formula by designating its length. If the instruction for addition is returned from the inference section 22, the operation proceeds from S59 to S60, and the search-formula correction processing section 21 changes the tree structure of the search formula to the instructed state in accordance with the instruction for addition from the inference section 22.

Alternatively, in S59, if the inference section 22 determines that none of the branches are preferably added, and an answer to that effect is received, a determination is made that that portion should be excluded by, for instance, changing the attribute of the node, and correction is given up. Then, the user is notified to that effect, and a measure is taken for such as invoking processing for automatically determining a node attribute for excluding that portion.

As a specific example, a description will be given by referring to FIGS. 13 and 14 mentioned above. A case is considered in which retrieval is effected by the structure of a search formula indicated by only the solid lines in FIG. 14 with respect to the structured document having the structure shown in FIG. 13. In this case, the search result is the portions of the node b "First, . . . " and the node a "Although it may appear that the introduction was not interesting, . . . " in FIG. 13. Here, if the user points out that the portion of the node b in FIG. 13 should not appear as the search result, the search-formula correction processing section 21 requests the inference section 22 to instruct a correcting method. Here, it is assumed that the search-formula correction processing section 21 has received an answer from the inference section 22 that the correction cannot be made.

The search-formula correction processing section 21 requests the structure analyzing section 23 to examine the subtrees located in the vicinities of the node b and the node a in FIG. 13 and corresponding to the portion of the tree indicated by the solid lines in FIG. 14. In the case of this example, branches 1, m, and n contiguous to the subtree overlapping with the tree structure of the search formula with respect to the node a which is already found to be correct are found. Of these branches, since a corresponding branch exists for the branch m in the vicinity of the node b, the branches 1 and n are extracted here. The extracted branches 1 and n are sent to the inference section 22, and one of them is selected. If the inference section 22 determines that it is best to add, for example, the branch 1 to the search formula, the search-formula correction processing section 21 corrects the structure of the search formula in such a way as to include a branch k corresponding to the branch 1 in FIG. 13, as indicated by the broken lines in FIG. 14. As a result of this correction, the result of retrieval using the corrected search formula does not include the portion of the node b in FIG. 3.

As can be appreciated from the above, it is unnecessary for the user to point out all the erroneous portions from the outset, and it suffices if after an indication is made appropriately, retrieval is executed, the processing is repeatedly carried out, and the correction is stopped when an intended result is obtained. The execution of retrieval midway in the process exerts no effect on the search-formula correction processing in accordance with the present invention.

FIGS. 16 to 19 are flowcharts illustrating an example of the operation by the inference section 22. As can be understood from the above description, requests to the inference section 22 include the following:

Request 1: Information on the fact that the branches are included in the search formula and information on their lengths are registered as hypotheses in the database 24. (S33 in FIG. 11)

Request 2: A determination. is made for the need to delete a branch from the search formula or setting its length free. (S42, S43 in FIG. 12)

Request 3: A corrected version is presented when the present search formula is incorrect.

Request 4: One branch is selected from candidate branches capable of being added to the search formula. (S58 in FIG. 15)

Figure 16:
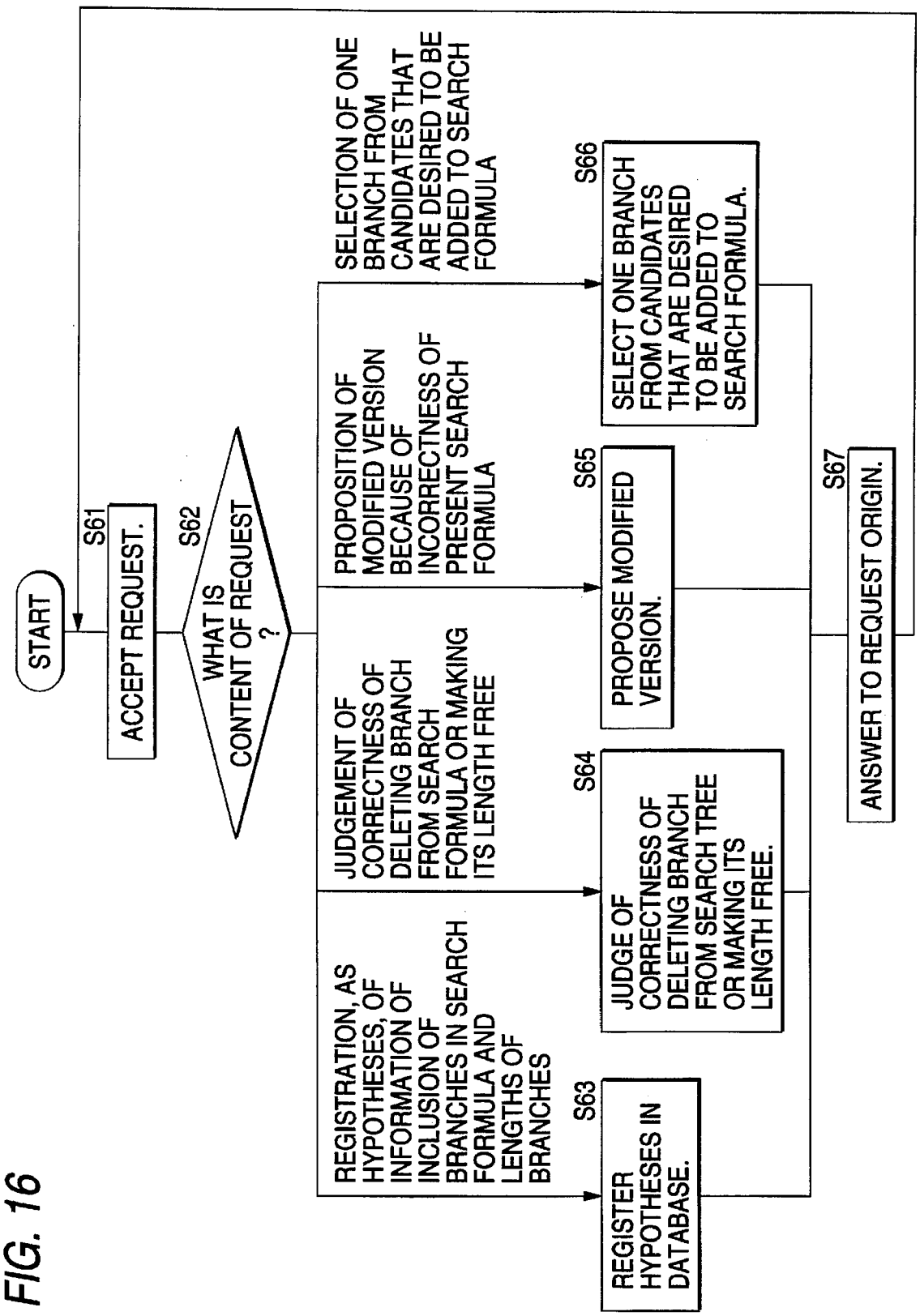
FIG. 16 is a flowchart illustrating an example of the overall operation of an inference section 22.

In S61 in FIG. 16, the inference section 22 accepts a request. In S62, a determination is made as to which of the aforementioned requests 1 to 4 the content of the accepted request corresponds, and one processing in S63 to S66 is selectively executed in response to that request. Then, an answer is returned to the requesting source in S67.

Hereafter, a description will be given of examples with respect to processing for the respective requests. With respect to the aforementioned request 1, only processing is carried out for registering in the database 24 as hypotheses information that the branches are included in the search formula and information on their lengths.

Figure 17:
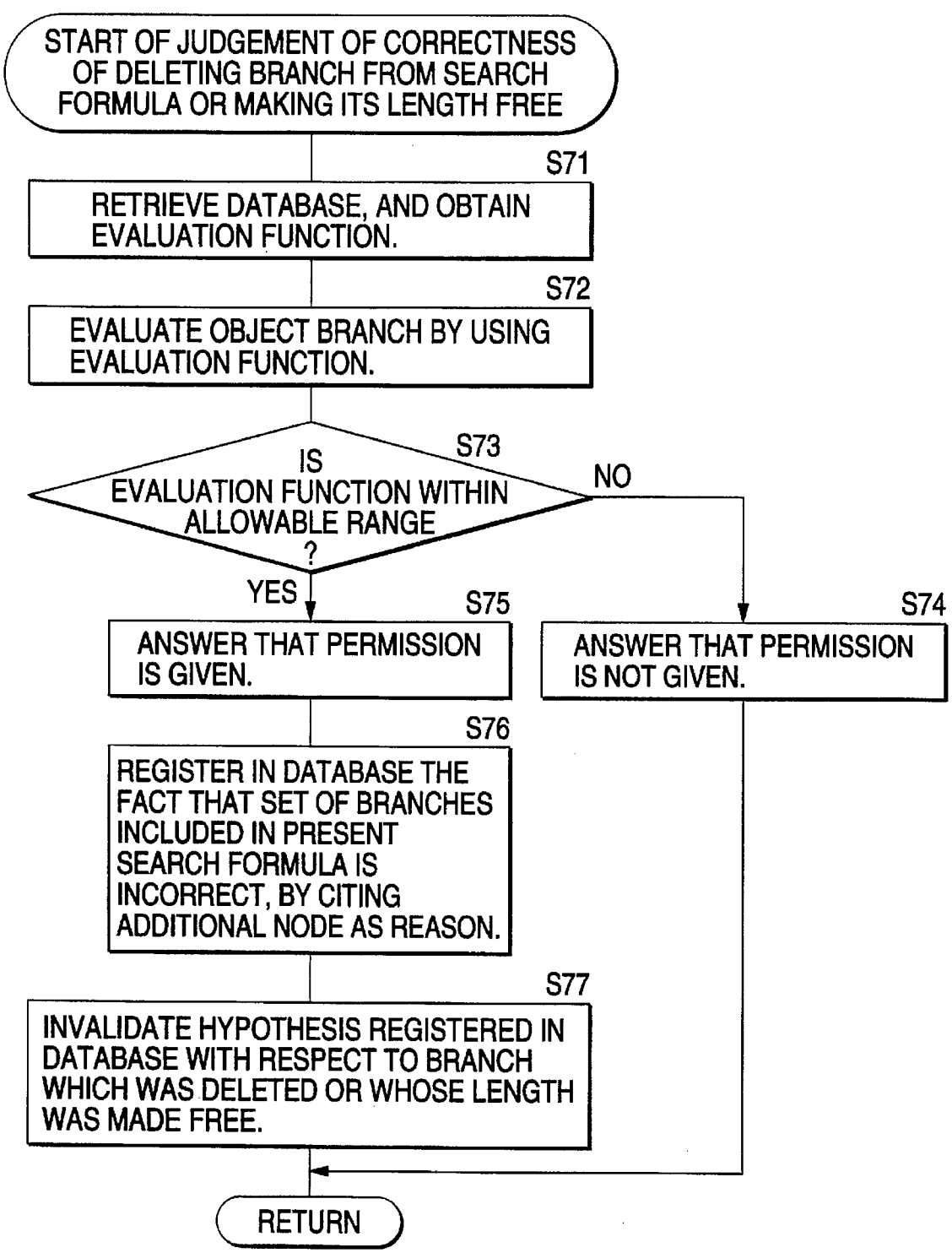
FIG. 17 is a flowchart illustrating an example of the operation for determining the need for deleting a branch in the inference section 22 from the search formula or making its length free.

With respect to the request 2, in S71 in FIG. 17, an evaluation function corresponding to the tree which is a subtree of the search formula is retrieved from the database 24. Here, a determination as to whether or not the tree is a subtree is effected by the structure analyzing section 23. An arrangement can be provided such that it is sufficient to adopt the data which is retrieved first by storing in advance the tree structure in the database 24 by taking priorities into account. A mathematical formula is fetched from the evaluation function corresponding to the retrieved tree structure. Then, in S72, calculation is performed by imparting to the mathematical formula an argument other than the shape of the tree, e.g., information on such as the overall size of the search formula and the number of branches to be deleted.

In S73, a determination is made as to whether the calculated evaluation value falls within a predetermined range. If the evaluation value does not fall within the range, in S74 an answer is returned to the requesting source that a permission is not given to the deletion of the branch from the search formula or the making of its length free. If the evaluation value falls within the range, in S75 an answer is returned to the requesting source that a permission is given to that request. Then, in S76, the fact that the combination of the states of the branches included in the present search formula is incorrect is registered in the database 24 together with the reason therefor. In addition, in S77, information in the database 24 concerning the branch which is to be deleted or whose length is to be made free is updated to a state in which the hypothesis is invalid.

For example, in the structure of the search formula shown in FIG. 14, in a case where the branch indicated by the broken line is to be removed from the branch of the search formula, the data constituting the subtree of the structure of the search formula shown in FIG. 14 is retrieved and fetched from the database 24. It is assumed that a mathematical formula forming a pair with the fetched data is, for example, the following formula:

(1-(number of branches to be deleted)/(number of total branches of the tree)) * 100

The number of branches to be deleted is 1, and the number of total branches of the tree is 5. Substituting these values into the formula, we have (1/5) * 100=80. If a definition is given in advance that a permission for deletion is to be given when the value is 60 or more, a permission for deletion is given. It goes without saying that if a definition is given in advance that a permission for deletion is to be given when the value is 90 or more, a permission for deletion is not given.

In this embodiment, two different evaluation functions are used in the example described below. Methods of realizing them are similar. However, since the two evaluation functions described below are merely devised to reach a proper search formula as quickly as possible, it is possible to use an evaluation function in which random numbers or constants are returned. In that case, a slightly larger number of indications of error may only be required for reaching a formula intended by the user.

Figure 18:
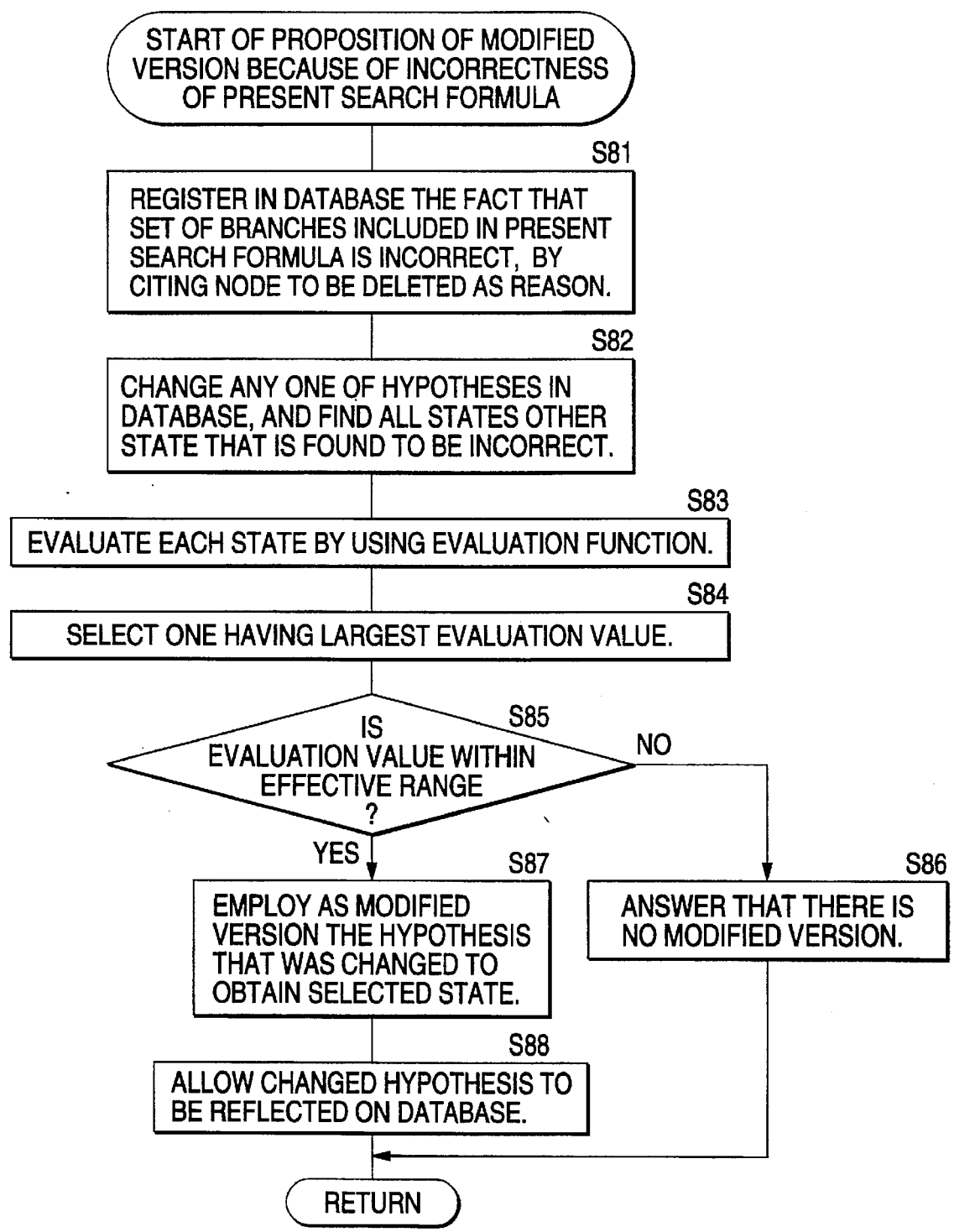
FIG. 18 is a flowchart illustrating an example of the operation for presenting a corrected version in the inference section 22.

With respect to the requirement 3, first in S81 in FIG. 18, the fact that the combination of the states of branches included in the present search formula is incorrect is registered in the database 24 together with the reason therefor. In S82, any one of the hypotheses registered in the database 24 is changed, and candidates for a new search formula are found. At this time, all the states are found other than the states including combinations of branches which have been registered in the database 24 by requests made hitherto to the inference section 22, and which have been found to be incorrect. Consequently, it is possible to obtain a learning effect using a history of the combinations of branches which were determined to be incorrect in the past. There are a plurality of states determined. For this reason, an evaluation is carried out in S83 by using an evaluation function prepared for each state. In S84, a state exhibiting the highest evaluation value is selected on the basis of the calculated evaluation value. In S85, a determination is made as to whether the evaluation value falls within a predetermined range. If the evaluation value does not fall within the range, in S86 the fact that there is no corrected version is returned to the requesting source as an answer. If the highest evaluation value falls within the predetermined range, in S87 information on the hypothesis changed for obtaining the state of the highest evaluation value is returned to the requesting source as a corrected version. Then, in S88, the changed hypothesis is reflected on the database 24.

Figure 19:
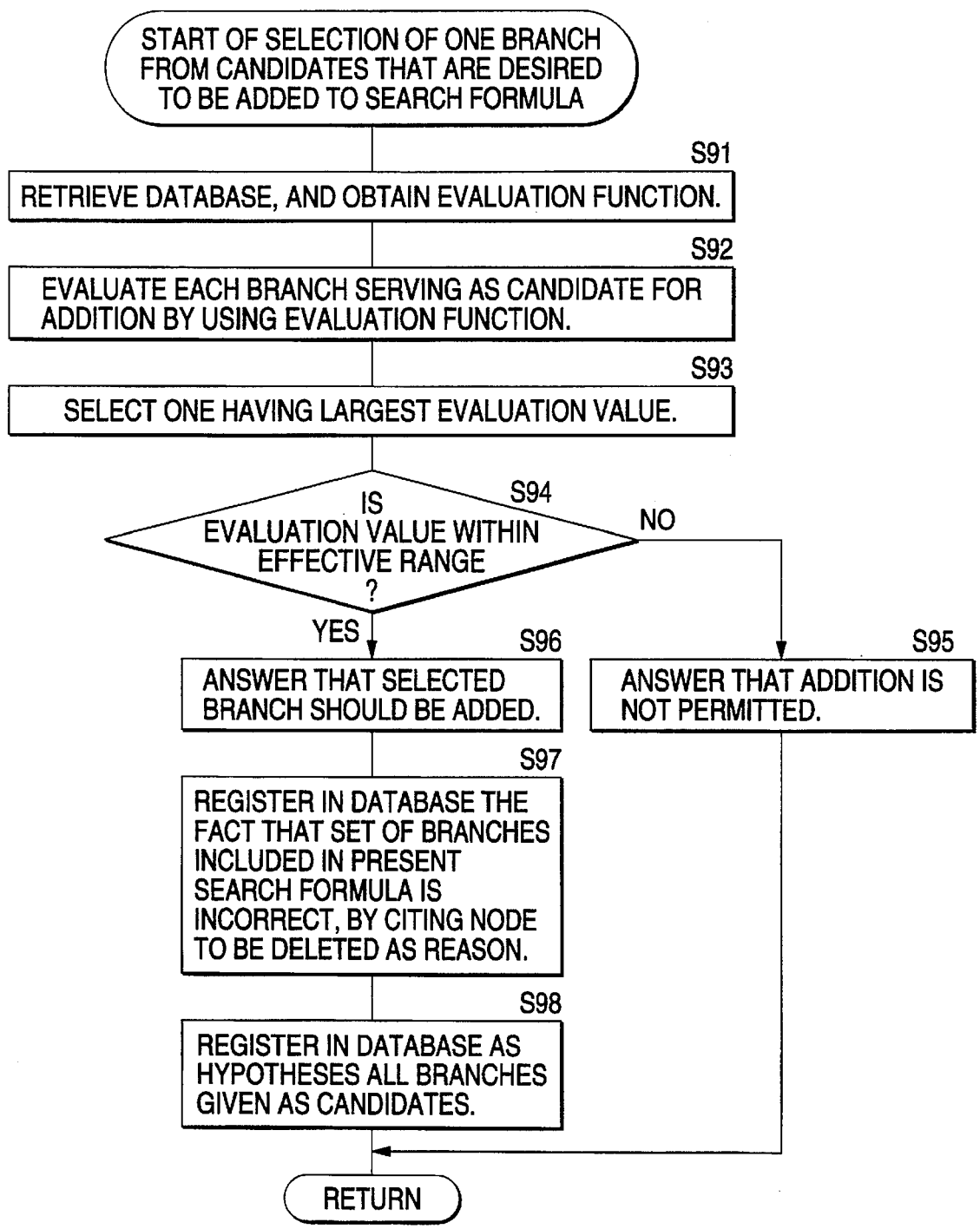
FIG. 19 is a flowchart illustrating an example of the operation for selecting one from candidate branches for addition in the inference section 22.

With respect to the request 4, in S91 in FIG. 19, the database 24 is retrieved on the basis of the shape and the like of the tree so as to obtain an evaluation function for evaluating the need for addition. Then, in S92, with respect to each candidate branch for addition, the branch and the overall size of the tree of the search formula are evaluated as an input. In S93, a result exhibiting the highest evaluation value based on the evaluation function is selected. In S94, a determination is made as to whether the selected evaluation result is effective. If it is not effective, in S95 an answer to the effect that the addition is not permitted is returned to the requesting source. If the evaluation result is effective, in S96 an answer that the branch having the selected evaluation result is to be added is returned to the requesting source. In S97, the fact that the combination of the states of the branches included in the present search formula is incorrect is registered in the database 24 together with the reason therefor. In addition, in S98, with respect to the respective candidate branches, information in the database 24 is updated. At this time, as for the selected branch, their hypotheses are registered as being in the valid state, and as for the branches which were not selected, their hypotheses are registered as being in the invalid state.

As can be seen from the aforementioned flowcharts, the fact that the set of the branches included in the search formula is incorrect is registered in the database in S76 in FIG. 17, S81 in FIG. 18, and S97 in FIG. 19, and candidates for the search formula which would include the registered incorrect sets of branches are rejected. Consequently, since the correction is carried out without repeating the same error twice, if the number of indicated portions increases, it is possible to allow the formula to gradually approach a correct formula reliably. In addition, since reasons are provided for the incorrect combinations of the states of branches, in a case where the reason itself is canceled, it is possible to restore the combination of states of branches, so that it is possible to cope with a situation where the error-indicating operation by the user was in error.

The configuration of this second embodiment can, of course, be used independently, in which case a search formula is provided in advance. In addition, essential portions of the second embodiment can be incorporated as the search-formula editing section 5 in the first embodiment. In this case, the function of the structure analyzing section 23 and the like can be realized by using the search-formula structure extracting section 2, the search-condition extracting section 3, and the like. In addition, the database 24 can, of course, be made common with the knowledge base 6.

As is apparent from the above-described description, in accordance with the present invention, it is possible to automatically generate a search formula by a simple operation. For instance, even a user who is not knowledgeable about the internal structure of a structured document or the grammar of the formula is able to obtain an intended formula in a simple manner. Consequently, general users are capable of making effective use of the advantage of structured documents. Further, the system for assisting the generation of a search formula in accordance with the present invention is useful for skilled users as well, since it is possible to eliminate inadvertent errors virtually completely, and it is possible to generate an intended formula accurately in a short time. In addition, in the configuration having the search-formula editing means, there is an advantage in that the search formula can be edited while always maintaining the correctness of the search condition.

In addition, since the search formula for a structured document can be automatically corrected by a simple operation of pointing out an error in the search result, even a user who is not knowledgeable about the grammar of the search formula for retrieving a structured document is able to obtain an intended formula in a simple manner. Consequently, general users are capable of making effective use of the advantage of structured documents. Further, the system for assisting the generation of a search formula in accordance with the present invention is useful for skilled users as well, and there is an advantage in that it is possible to eliminate inadvertent errors virtually completely, and it is possible to generate an intended formula accurately in a short time.

What is claimed is:

1. A system for assisting generation of a search formula used for effecting retrieval processing with respect to a structured document, comprising:

storage means for storing the structured document;

structure extracting means for extracting, based on a substructure of the structured document exemplified by a user as a search result, a substructure including the exemplified substructure; and search formula synthesizing means for synthesizing a search formula from the extracted substructure.

2. The system according to claim 1, further comprising search formula editing means for modifying the search formula in accordance with an editing operation instruction from a user on condition that the modified search formula matches the substructure used in synthesizing the search formula.

3. A system for assisting generation of a search formula used for effecting retrieval processing with respect to a structured document, comprising:

searching means for effecting a search in accordance with a search formula;

input means for allowing a user to indicate an error in results of the search by the searching means; and search formula correcting means for correcting the search formula based on a substructure including a portion corresponding to the indicated error and a structure of the search formula.

4. The system according to claim 3, further comprising a database for sequentially storing information on respective branches appearing in the structure of the search formula and on sets of branches appearing in the structure of the error-indicated search formula, wherein the search formula correcting means corrects, while referring to the database, the search formula based on candidates for correction other than candidates for correction of the search formula including any of the sets of branches stored in the database.

* * * * *